United States Patent [19]

McCann

[11] 3,723,800

[45] Mar. 27, 1973

[54] CHARGED PARTICLE BEAM SCANNING APPARATUS WITH VIDEO SWITCHING NETWORK

[75] Inventor: Farrell A. McCann, Hawthorne, Calif.

[73] Assignee: Northrop Corporation, Los Angeles, Calif.

[22] Filed: Feb. 8, 1971

[21] Appl. No.: 113,567

[52] U.S. Cl. ....................315/12, 315/13 R, 315/30, 313/87

[51] Int. Cl. ........................................H01j 29/41

[58] Field of Search .........315/12 R, 13 R, 13 ST, 24, 315/26, 30, 12; 313/87, 105

[56] References Cited

UNITED STATES PATENTS

| | | | |
|---|---|---|---|
| 3,408,532 | 10/1968 | Hultberg et al. | 315/12 R |
| 3,421,042 | 1/1969 | Hultberg | 315/12 R |
| 3,483,422 | 12/1969 | Novotny | 313/105 X |
| 3,539,719 | 11/1970 | Requa et al. | 315/12 X |
| 3,544,835 | 12/1970 | Neilson | 315/24 X |
| 3,600,627 | 8/1971 | Geode | 315/12 R |
| 3,612,944 | 10/1971 | Requa et al. | 315/12 R |

*Primary Examiner*—Carl D. Quarforth
*Assistant Examiner*—P. A. Nelson
*Attorney*—Sokolski & Wohlgemuth and W. M. Graham

[57] ABSTRACT

Sequentially appearing video signals as may be generated by means of a single scanning beam are processed for display in a plurality of simultaneously appearing beams of a charged particle beam scanner. Video signals corresponding to each of the scanning beams are successively fed to corresponding hold circuits, the number of such hold circuits corresponding to the number of scanning beams. The scanner has a plurality of beam channels defined between an area charged particle source and target with control plate means simultaneously controlling the scanning of each of the beams in these channels. A modulator control plate also is included for simultaneously controlling the intensity of each of the beams. Video signals are simultaneously fed from the hold circuits to corresponding beam control electrodes of the modulator control plate to provide simultaneous modulation of all of the beams. In this manner successive groups of consecutively arriving video signals, are memorized in hold circuits and then simultaneously used to modulate corresponding beams which are controlled to scan the target.

11 Claims, 6 Drawing Figures

INVENTOR
FARRELL A. MC CANN
BY
SOKOLSKI & WOHLGEMUTH
ATTORNEYS

Patented March 27, 1973 | 3,723,800

4 Sheets-Sheet 2

INVENTOR
FARRELL A. MC CANN
BY
SOKOLSKI & WOHLGEMUTH
ATTORNEYS

INVENTOR
FARRELL A. MC CANN
BY
SOKOLSKI & WOHLGEMUTH
ATTORNEYS

INVENTOR
FARRELL A. MC CANN
BY
SOKOLSKI & WOHLGEMUTH
ATTORNEYS

CHARGED PARTICLE BEAM SCANNING APPARATUS WITH VIDEO SWITCHING NETWORK

This invention relates to charged particle beam scanners, and more particularly to the conversion of single beam related signals to a form for multiple beam display in such scanners.

In U.S. Pat. No. 3,408,532, issued Oct. 29, 1968, an electron beam scanner is described which utilizes a plurality of dynode control plates sandwiched between an area cathode and a flat plate target. In this type of device it has been found desirable to provide electron beam multiplication by the use of dynodes to afford the required display intensity. The device of the present invention provides means for increasing display intensity in a charged particle beam scanner by providing greater dwell time at each scanning element, thus increasing the average current and lowering the electron multiplication needed for a given display intensity. This end result is achieved without increasing the total scanning time by covering the scanning area with a plurality of simultaneously energized scanning beams.

It is therefore the principal object of this invention to increase the display intensity of a charged particle beam scanner.

It is another object of this invention to provide means for converting a single scanning beam video signal to a form for display on a plurality of beams.

It is still another object of this invention to increase the intensity of the display in a charged particle beam scanner without increasing the peak beam current.

Other objects of this invention will become apparent as the description proceeds in connection with the accompanying drawings, in which.

Figure 4:
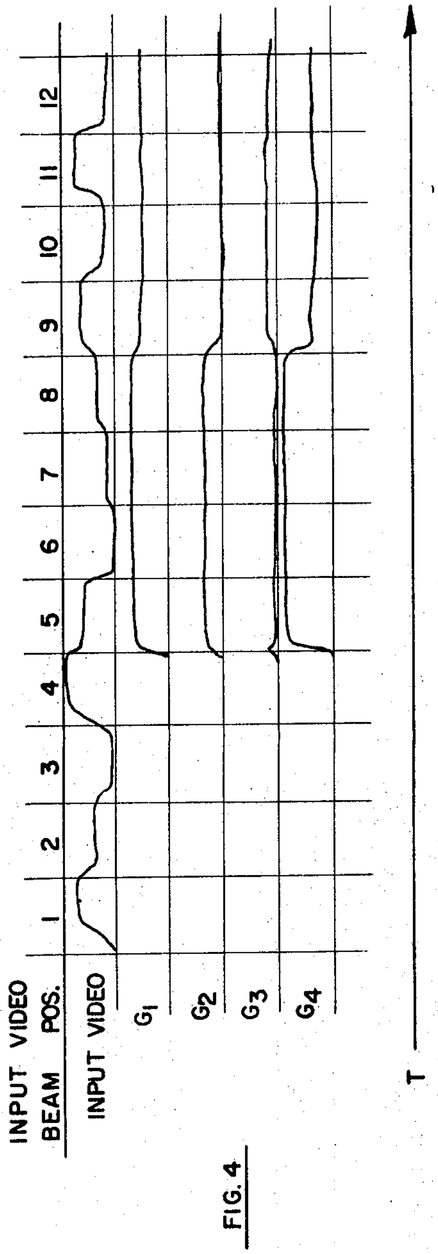

FIG. 4 illustrated typical video wave forms developed in the device of the invention.

Figure 5:
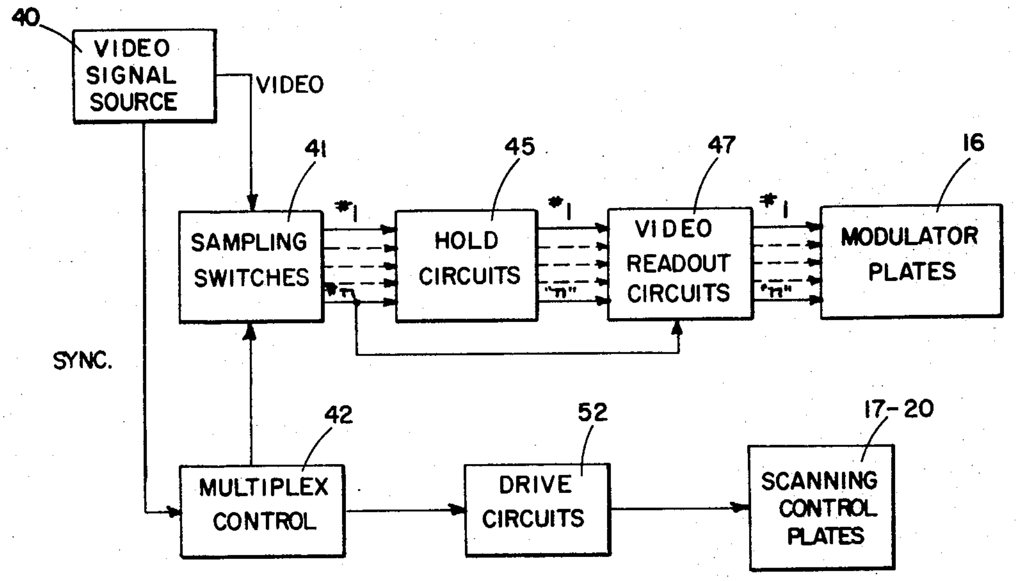
Figure 6:
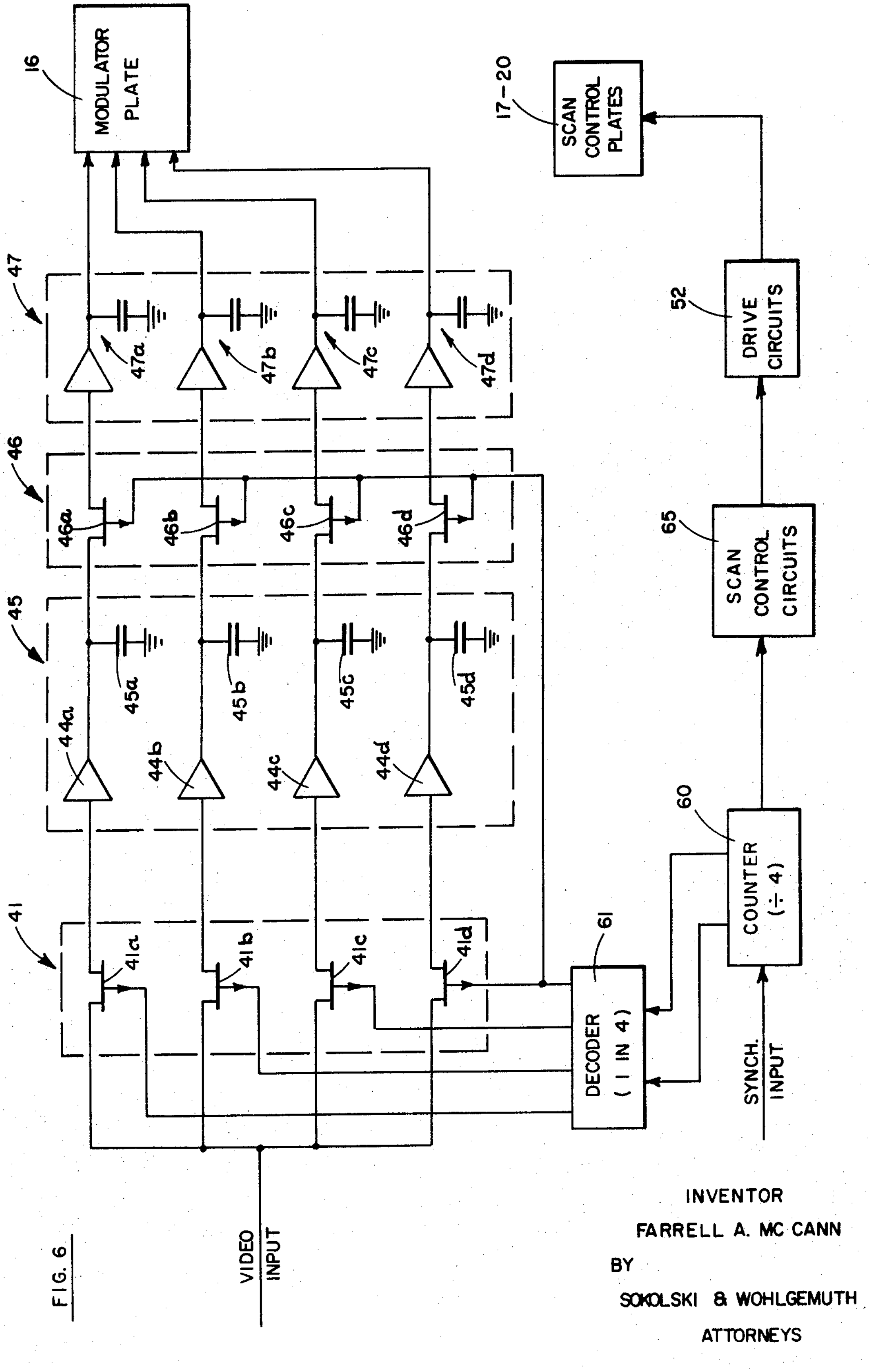

FIG. 5 is a functional block diagram illustrating the cir-cuitry used in the invention, and FIG. 6 is a schematic drawing illustrating one embodiment of the switching and hold circuits of the device of the invention.

The device of the invention is briefly described as follows:

A charged particle scanner, which may be an electron beam scanner of the general type described in U.S. Pat. No. 3,408,532, issued Oct. 29, 1968 (Hultberg et al), or Application Ser. No. 89,879, filed Nov. 16, 1970 now abandoned, (Hant), has an area cathode and an area target between which are sandwiched a plurality of scanning control plates. Electron beam channels are formed between the cathode and the target, the control plates being adapted to control the simultaneous scanning of a plurality of electron beams in these channels. A modulator control plate is also included in the electron beam channels, this modulator plate having separate electrodes for controlling the intensity of each of the electron beams. Video signal elements related to a single scanning beam are sequentially fed to separate hold circuits for each of the beams, and when the video signals corresponding to a group of scanning elements has been received by the hold circuits, these video signals are simultaneously fed to their corresponding modulator plate control electrodes. In this manner, simultaneous modulation of the plural beams in response to successive groups of sequentially arriving video signals is provided.

Figure 1:
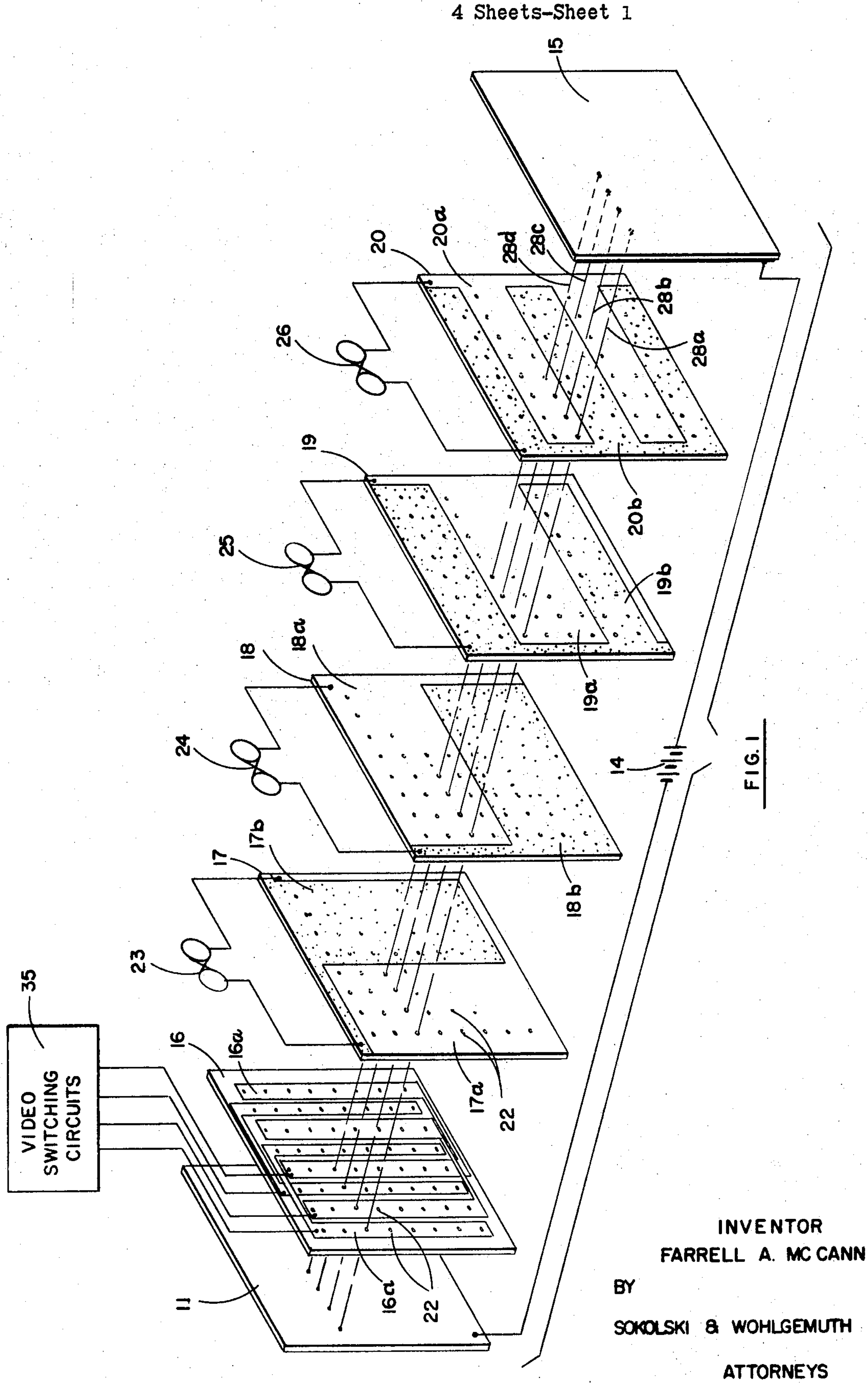
FIG. 1 is a schematic drawing illustrating the basic operation of the device of the invention.

Referring now to FIG. 1, one embodiment of the device of the invention is illustrated. Beam scanning control may be of the type described in the aforementioned U.S. Pat. No. 3,408,532, which describes dynode control plates with electron multiplication, or the aforementioned Application Ser. No. 89,879 filed Nov. 16, 1970, now abandoned in which the control plates utilize electrostatic focusing. Charged particles, which may be electrons or positive or negative ions, are emitted by source 11 over the area encompassed by a predetermined scan. For the purposes of facilitating the discussion, the charged particles will hereinafter be described as electrons.

A voltage source 14 is connected between electron source 11 and target 15 to accelerate the flow of electrons therebetween. Sandwiched between source 11 and target 15 are modulation plate 16 and scan control plates 17–20. Modulator plate 16 and control plates 17–20 have a plurality of apertures 22 formed therethrough, corresponding apertures on successive plates being aligned with each other such that each aligned set of apertures forms an electron beam channel between source 11 and target 15. An associated flipflop switching circuit 23–26 is connected between each of paired electrodes *17a*, *17b–20a*, *20b* respectively, the electrodes of each pair being insulated from each other. For the illustrative example of FIG. 1, the "a" electrodes (shown unstippled) are given potentials such as to direct electrons through the apertures formed therein while the "b" electrodes (shown stippled) are given potentials such as to abort the passage of electrons through their associated apertures. How this may be accomplished is fully described in the aforementioned patent and patent application and therefore need not be repeated here. Under switching control conditions, shown in FIG. 1 for illustrative purposes, the four adjacent beams *28a–28d* will pass through to target 15, the passage of electrons through all of the remaining channels being aborted. It should be apparent that by variously actuating flipflops 23–26 the four beams can be caused to scan the entire area encompassed by the electron beam channels in either a regular or random scan pattern.

Figure 2:
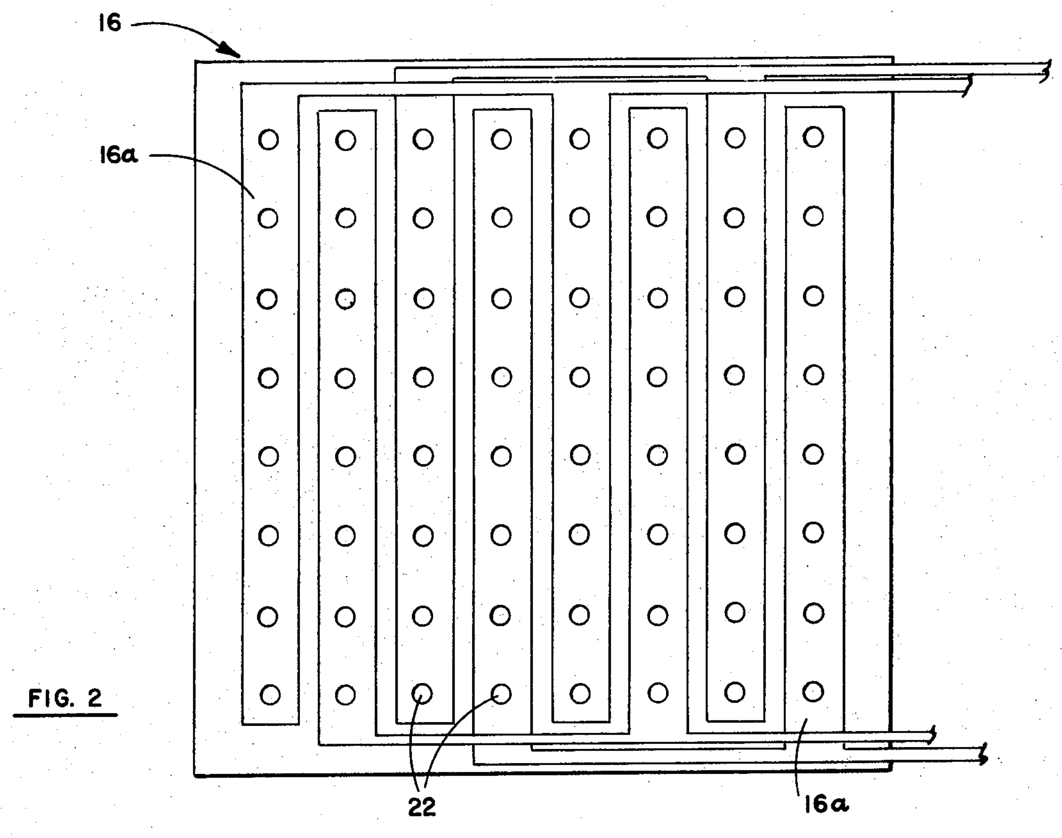
FIG. 2 is a schematic drawing illustrating a modulator plate of one embodiment of the device of the invention.

Each of the beams is intensity modulated by video signals fed to the electrodes *16a*, of modulator plate 16 from video switching circuits 35. The structure of modulator plate 16 can be more clearly seen in FIG. 2. Electrodes 16a are arranged in longitudinal strips on a dielectric substrate with the 1st and 5th, 2nd and 6th, 3rd and 7th, and 4th and 8th such strips being connected together and thence to the video switching circuits. Thus successive groups of video signals as they appear in the scanning pattern of the input are utilized to simultaneously control the intensites of each of the beams. How this is accomplished will be described and illustrated more fully in connection with FIGS. 3–6.

It is to be noted that the four-beam scan shown in FIG. 1 is only illustrative of one of many multiple beam patterns that can be utilized. A greater or lesser number of simultaneous beams can be obtained by utilizing various other combinations of scanning control plates with of course different connections for the electrodes of modulator plate 16 to control the particular number of beams utilized.

Referring now to FIG. 5, a block diagram illustrating the basic circuitry for the scanner of this invention is schematically illustrated. Video signals to be displayed or stored on a target plate are fed from video signal source 40 to sampling switches 41. The video signals may, for example, comprise the type utilized in a television display. The synchronization signals for the video are fed to multiplex control 42. Multiplex control 42 provides a control signal for actuating each of the sampling switches 41 in succession, this sampling being made in synchronization with the video signals. The number of sampling switches corresponds to the number of scanning beams to be used (in the illustrative example of FIG. 1, this number being 4).

The outputs of sampling switches 41 are successively fed to separate corresponding ones of hold circuits 45, where these bits of video information are separately retained. When a group of video signals, including one such signal for each of the beams, has entered hold circuits 45 (i.e., as the last or "*n*th" switch is actuated), video readout circuits 47 are actuated in response to this last signal to provide simultaneous readout of all of the signals from hold circuits 45 to modulator plate 50.

Multiplex control 42 also provides control signals for drive circuits 52 (which may include flipflops 23–26 of FIG. 1), these drive circuits providing the control signals for scanning control plates 17–20.

Figure 3:
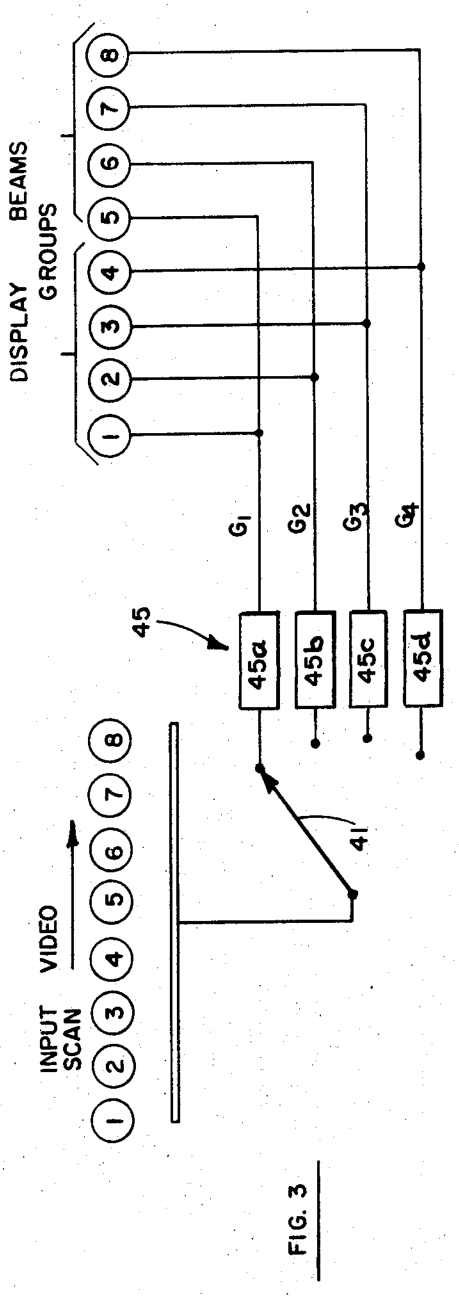
FIG. 3 is a schematic drawing illustrating the basic technique utilized in the invention in converting from single to multiple beam operation.

Referring now to FIGS. 3 and 4, the generation of multiple beam signals from a single signal is schematically illustrated. In the line of FIG. 4 marked "input video", the amplitude variations of a typical video signal against the time base "T" of a scanning pattern are illustrated. The columns in FIG. 4 (designated 1–12) each represents a positional increment in the scanning pattern of the input video signal. Thus, with the commencement of the scan, the bits of video illustrated in FIG. 4 appearing during scanning increments 1–4 respectively are successively fed through switch 41 (FIG. 3) to hold circuits **45*a*–45*d* respectively. These signals designated "G1–G4" are simultaneously modulated onto the four beams for display by means of the video readout circuits 47 (described in connection with FIG. 5). This occurs during the next succeeding four beam positions 5–8, as shown in FIG. 4. The same operation is repeated for beam positions 9–12**, etc. Thus, it should be apparent with the multiple beam operation of this invention that the video signals representing each bit of video information activate the target for a considerably longer time than with a single scanning beam (in this instance four times as long).

Referring now to FIG. 6, one embodiment of circuitry that may be utilized for the single to multiple beam conversion is schematically illustrated. The video signals are simultaneously fed to field effect transistors **41*a*–41, which form sampling switches 41. The video synchronization signals are fed to divide-by-four counter 60 which provides binary coded output signals in a four count pattern. The output of counter 60 is decoded in decoder 61, which may comprise logical gating circuitry to provide successive actuation pulses to each of field effect transistors 41*a*–41*d*. Thus, successive bits of video information are passed from each of the field effect transistors to an associated one of amplifiers 44*a*–44*d* and sent to an associated storage capacitor 45*a*–45*d* which retains the video signals received thereby. The video signals stored in capacitors 45*a*–45 are each fed to a field effect transistor 46*a*–46 and thence to an associated one of amplifier and associated hold capacitors 47*a*–47*d*. Field effect transistors 46*a*–46*d* act as switches which are simultaneously actuated in response to the fourth output of decoder 61, i.e., the output of which controls the last of the video signals in each group (fed to transistor 41*d*). Thus, the previously stored signals are simultaneously read out from read-out circuits 47 to the electrodes of modulator plate 16. The synchronous signal output of counter 60 is utilized to control scan control circuits 65 which, as previously described, in turn provide the control signals to drive circuits 52 for the scan control of plates 17–20.**

It should be immediately apparent that while the operation of the invention has been described in conjunction with only 64 electron beam channels, a typical display would have many more channels than this. The implementation of a device having a greater number of channels could be achieved in the same manner described herein. Also, as already mentioned, a conversion can be made to a different number of beams than that herein described by utilizing a different combination of control plates and with different connections for the electrodes of the modulator plate.

While the operation of the invention has been described and illustrated in detail, it is to be clearly understood that this is intended by way of illustration and example only and is not to be taken by way of limitation, the spirit and scope of this invention being limited only by the terms of the following claims.

I claim:

1. In a charged particle beam scanner, said scanner including an area charged particle source, an area target, and a plurality of control members sandwiched between the source and the target for controlling a plurality of charged particle beams therebetween, means for modulating video signals related to a single scanning beam on said plurality of beams comprising:

a modulator member positioned between said cathode and said target having a modulation control electrode for controlling each of the beams, a video hold circuit for each of said modulation control electrodes, means for consecutively feeding each signal of groups of said video signals to corresponding ones of said hold circuits in succession, and means for simultaneously providing a video output from each of said hold circuits to said modulation control electrodes when said hold circuits have received all of the signals in a group of said video signals.

2. The scanner of claim 1 wherein said charged particles are electrons.

3. The scanner of claim 1 wherein said control members and modulator member have apertures formed therein, corresponding apertures on said members being aligned with each other to define beam channels running between the source and target.

4. The scanner of claim 3 wherein said modulator member control electrodes are arranged in groups of strips, corresponding strips of each group being connected together.

5. The scanner of claim 1 wherein said means for consecutively feeding each signal of said groups of signals to said hold circuits comprises a sampling switch connected to each of said hold circuits and means for successively actuating each of said sampling switches.

6. The scanner of claim 5 wherein said means for providing a video output from said hold circuits comprises a plurality of electronic switches, said switches being simultaneously actuated in response to the actuating means for the last of said sampling switches to be actuated.

7. In a charged particle beam scanner, said scanner including an area charged particle source, an area target, and a plurality of control members sandwiched between the source and the target for simultaneously controlling a plurality of charged particle beams therebetween, said control members further having a plurality of aligned apertures therein which define charged particle beam channels, means for modulating video signals related to a single scanning beam on said plurality of beams comprising:

a modulator member between said cathode and said target having apertures therein aligned with the control member apertures and corresponding to each of the beam channels, said modulator member further having a modulation control electrode for controlling the modulation of each of the beams, a video hold circuit for each of said modulation control electrodes, means for consecutively feeding each signal of groups of said video signals to corresponding ones of said hold circuits in succession, and means for simultaneously providing a separate video output from each of said hold circuits to a corresponding modulation control electrode when said hold circuits have received all of the signals in a group of said video signals.

8. The scanner of claim 7 wherein said modulation control electrodes are arranged in groups of strips, corresponding electrodes of each group being connected together.

9. The scanner of claim 8 wherein each of said strips encompasses a line of said apertures.

10. The scanner of claim 7 wherein said means for consecutively feeding each of said signals to said hold circuits comprises a sampling switch connected to each of said hold circuits and control means for successively actuating each of said sampling switches.

11. The scanner of claim 10 wherein said means for providing a video output from said hold circuits comprises electronic switches connected to corresponding ones of said modulation control electrodes, said switches being simultaneously actuated in response to the actuating means for the last of said sampling switches to be actuated.

* * * * *